(12) United States Patent
Braig et al.

(10) Patent No.: US 7,204,747 B2
(45) Date of Patent: Apr. 17, 2007

(54) DEVICE AND METHOD FOR FILLING SAUSAGE SLEEVES WITH PASTE FILLING MATERIAL

(75) Inventors: Wolfgang Braig, Laupheim (DE); Gerhard Schliesser, Wain (DE)

(73) Assignee: Albert H. Handtmann Maschinenfabrik GmbH & Co. KG, Biberach/Riss (DE)

( * ) Notice: Subject to any disclaimer, the term of this patent is extended or adjusted under 35 U.S.C. 154(b) by 0 days.

(21) Appl. No.: 11/359,177

(22) Filed: Feb. 22, 2006

(65) Prior Publication Data

US 2006/0199485 A1 Sep. 7, 2006

(30) Foreign Application Priority Data

Feb. 25, 2005 (EP) .................. 05004120

(51) Int. Cl.
*A22C 11/00* (2006.01)
(52) U.S. Cl. .................................................. 452/32
(58) Field of Classification Search ............ 452/30–35, 452/37–39, 45–51
See application file for complete search history.

(56) References Cited

U.S. PATENT DOCUMENTS

| | | | | |
|---|---|---|---|---|
| 3,975,795 A | * | 8/1976 | Kupcikevicius et al. ...... | 452/38 |
| 4,670,942 A | * | 6/1987 | Townsend ..................... | 452/37 |
| 5,067,313 A | * | 11/1991 | Evans ........................... | 53/576 |
| 5,152,712 A | * | 10/1992 | Nausedas ...................... | 452/38 |
| 5,180,327 A | * | 1/1993 | Kasai et al. .................. | 452/47 |
| 5,512,012 A | * | 4/1996 | Lendle et al. ................. | 452/35 |

FOREIGN PATENT DOCUMENTS

| | | |
|---|---|---|
| CH | 382440 A5 | 9/1993 |
| EP | 0 247 462 A1 | 12/1987 |
| EP | 1 230 858 A2 | 8/2002 |
| GB | 976 987 A1 | 12/1964 |
| GB | 1 443 487 | 7/1976 |

* cited by examiner

*Primary Examiner*—Thomas Price
(74) *Attorney, Agent, or Firm*—Marshall, Gerstein & Borun LLP

(57) ABSTRACT

A method and a device for filling a sausage sleeve with paste filling material, where to facilitate a more uniform ejection of the paste filling material and to minimize turbulences in the filling flow on exiting the filling tube, and so as to achieve a smooth sausage surface, a bush with conical inner contour, which protrudes over the ejection end, is fitted around the region of the ejection end of the filling tube.

18 Claims, 2 Drawing Sheets

DEVICE AND METHOD FOR FILLING SAUSAGE SLEEVES WITH PASTE FILLING MATERIAL

CROSS-REFERENCE TO RELATED APPLICATION

The present application claims the benefit of priority of European Patent Application No. 05 004 120.1 filed on Feb. 25, 2005. The entire text of the priority application is incorporated herein by reference in its entirety.

FIELD OF THE DISCLOSURE

The disclosure relates to a device and a method for filling sausage sleeves with paste filling material.

BACKGROUND OF THE DISCLOSURE

Such sausage filling machines and methods are already known. With such known devices and known methods, paste filling material, for example sausage meat, is pushed into a sausage sleeve via a filling tube. The sausage sleeve is pulled onto the filling tube and is pulled off from the filling tube in a known manner by a brake ring of a skin brake and is thus kept under tension.

To manufacture single portions the filled sausage skein is divided up by displacement elements. The displacement elements can for example be displacement wings, which move towards one another in a rotational movement, so that the filled skein is divided up by the closing wings. The filled sausage skein is then conveyed further by a transport unit, such as a longitudinal unit, in the transport direction. The filled sausage skein is held by the longitudinal unit such that when the filled skin with the filling tube and the skin brake is rotated and twists with respect to the held sausage, at the place at which the paste material is displaced, a twist-off point can form and the sausage twisted off.

In this respect the following problem arises with certain types of sausage:

With frying material containing meat or rind garnishes (smaller than 2 mm), many meat or rind particles collect on the outer surface of the sausage and are then visible through the sausage sleeve. The surface of the sausage is thus uneven. With certain types of sausage, e.g. hot dog, a smooth and homogeneous external structure without visible particles is however desired. This sort of smooth external structure is provided by a film of animal protein which forms during production on the inner wall of the filling tube and when the filling is ejected, it flows underneath the sausage sleeve.

Here however there is the problem that the sausage forming in the region between the end of the filling tube and the conveyor belts is not held radially. Consequently, the flow of filling on exiting the nozzle can move due to the rotation out of the central axis. The protein film, which is formed on the inner wall of the filling tube by the friction and which should flow towards the outer side of the sausage, is therefore broken up by turbulent flows and the filling moves from the inside of the filling flow (including meat particles) towards the outside, which in turn leads to a coarse and visually inhomogeneous surface on which particles are visible.

SUMMARY OF THE DISCLOSURE

The object of the disclosure is therefore to provide a device and a method of filling a sausage sleeve with paste material, which enables paste material to flow out evenly, whereby a sideward deflection and therefore an imbalance in the emitted paste material is prevented and the forming sausage is held in the center.

Due to the fact that according to the disclosure the filled sausage skein on the end of the filling tube is passed through a bush with a conical inner contour, which protrudes over the ejection end in the transport direction, a sideward deflection and thus an imbalance in the emitted filling flow can be prevented and the forming sausage can be held in the center. Due to this special process, the turbulence of the filling flow is reduced on exiting the filling tube.

In a preferred manner the bush is attached to the skin brake, e.g. on the housing or on the support of the skin brake. Thus, the bush can be fitted in a simple manner such that the bush can rotate together with the skin brake for twisting off the filled sausage skein, According to a preferred embodiment, the conical inner contour exhibits an opening angle a in a range from 40 to 60°, preferably 50°. This angular range facilitates a uniform emitted flow.

Advantageously, the conical inner contour exhibits longitudinal engaging ribs. The longitudinal engaging ribs facilitate reliable twisting off, whereby a form fit with the sausage is obtained.

On the inner wall of the filling tube a film of protein forms which flows under the sausage sleeve when the filling material is ejected. This type of protein film ensures a smooth surface on the sausage. Because the turbulence of the filling flow can be reduced on exiting the filling tube due to the bush according to the invention, the protein film can be specifically passed to the outside and is thus retained on the outer side of the sausage.

Preferably, the skin brake is arranged on the filling tube such that the ejecting end of the filling tube protrudes over the brake ring by 0 to 2 mm. Thus, the bush can be attached to the skin brake in a simple manner and at the same time protrude over the ejection end of the filling tube. When the bush is mounted on the skin brake, it can be rotated with it in a simple manner. Due to the fact that the conical bush rotates at the same speed as the skin brake during the twist-off process on the filled sausage sleeve, the rotation of the forming sausage is supported.

BRIEF DESCRIPTION OF THE DRAWINGS

The disclosure is explained below in conjunction with the following drawings.

DETAILED DESCRIPTION OF THE DISCLOSURE

Figure 3:
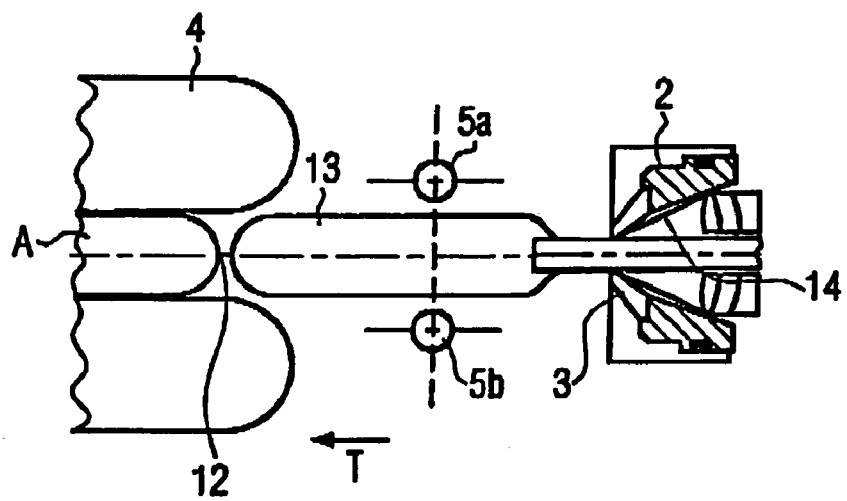
FIG. 3 shows a schematic section through a part of a filling machine according to the state of the art.

The sausage sleeve filling machine and method of the prior art is illustrated in FIG. 3. With that known device and method, past filling material, for example sausage meat, is pushed into a sausage sleeve 14 via a filling tube 1. The sausage sleeve 14 is pulled onto the filling tube 1 and is pulled off from the filling tube in a known manner by the brake ring 3 of a skin brake 2, and is thus kept under tension.

To manufacture single portions with such prior art machine and method of FIG. 3, the filled sausage skein 13 is divided up by the displacement elements 5a, b. The displacement elements 5a, b can, for example, be displacement wings, which move towards one another in a rotational movement, so that the filled skein is divided up by the closing wings. The filled sausage skein 13 is then conveyed further by a transport unit 4, here a longitudinal unit 4, in the transport direction T. The filled sausage skein 13 is held by the longitudinal unit 4 such that when the filled skin with the filling tube 1 and the skin brake 2 is rotated and twists with respect to the held sausage, at the place at which the paste material is displaced, a twist-off point 12 can form and the sausage twisted off.

Figure 1:
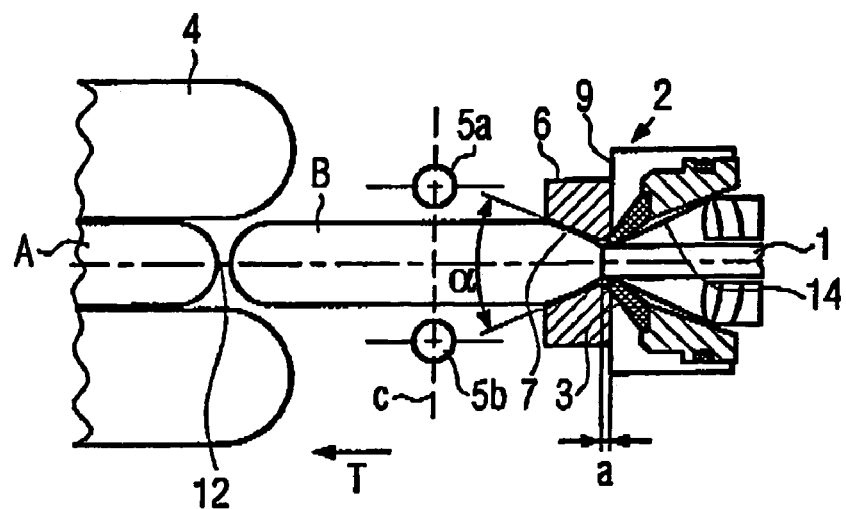
FIG. 1 shows schematically a section through the device according to the disclosure.

Turning to the present disclosure, FIG. 1 illustrates a device for filling sausage sleeves 14 with paste filling material with a filling tube 1 and a skin brake 2. As is known, a filling machine also exhibits a filling hopper and a suitable pump (not illustrated), which presses the paste filling material into the filling tube 1 continuously or intermittently. As already described in conjunction with the state of the art device illustrated in FIG. 3, the paste filling material ejected from the filling tube 1 fills the sausage sleeve 14 which is pulled through the skin brake 2. The sausage sleeve 14 is here gathered on the filling tube 1. The skin brake 2 exhibits in a known manner a brake ring 3, below which the sausage sleeve 14 runs and which keeps the sausage sleeve 14 under tension.

To twist off the filled sausage skein 13, the skin brake 2 can be rotated together with the filling tube 1 about the central axis A.

The device further comprises a longitudinal unit 4, which serves as a transport device, and moves the filled sausage skein 13 in the transport direction T. The longitudinal unit 4 here comprises two circulating conveyor belts, between which the filled sausage sleeve is transported further.

The device also comprises a displacement device with two displacement elements 5a, 5b, which for example comprise displacement wings, which move towards one another in a rotational movement, so that the filled sausage sleeve 13 can be divided up by displacement of the filling material to form individual portions of sausage. The twist-off point 12 can form, because after the displacement the filled sausage sleeve 13 is held between the belts of the longitudinal unit 4 against rotation before the filled sausage sleeve is rotated with the filling tube and skin brake 2 and twists with respect to the held sausage. The skin brake 2 represents an assembly comprising the shoulder 9, the adjusting screw 20 and the brake ring 3. It is also possible that the shoulder 9 and the bush 6 are formed as one part.

The device according to the disclosure is constructed such that the ejection end of the filling tube 1 only protrudes slightly over the brake ring 3. The distance a between the brake ring 3 and the ejection end of the filling tube 1 lies in a range between 0 and 2 mm. According to the invention, here, for example, a bush 6 is mounted on the shoulder 9 of the skin brake. The bush 6 protrudes over the ejection end of the filling tube 1 in the transport direction. The bush 6 exhibits a conical inner contour 7. Since the bush 6 here is mounted on the shoulder 9, it can be rotated with the skin brake 2 about the axis A for twisting off.

In FIGS. 2A to 2D the bush 6 is described in more detail in a preferred embodiment.

Figure 2A:
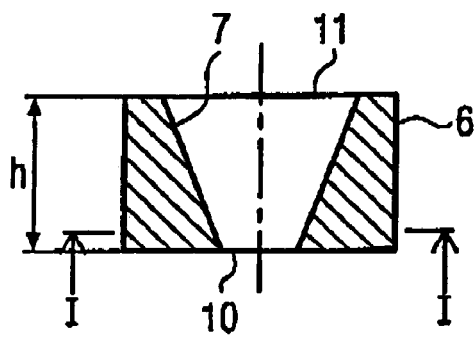
FIG. 2A shows a section through the bush with conical inner contour shown in FIG. 1.
Figure 2B:
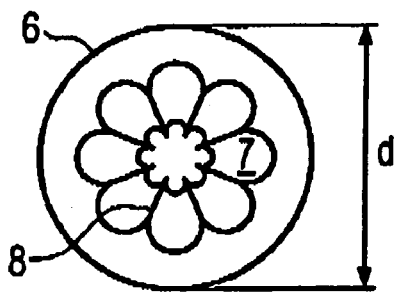
FIG. 2B is a plan view of the bush illustrated in FIG. 2A.
Figure 2C:
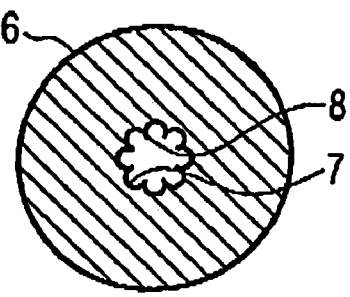
FIG. 2C is a section along the line I—I of FIG. 2A.
Figure 2D:
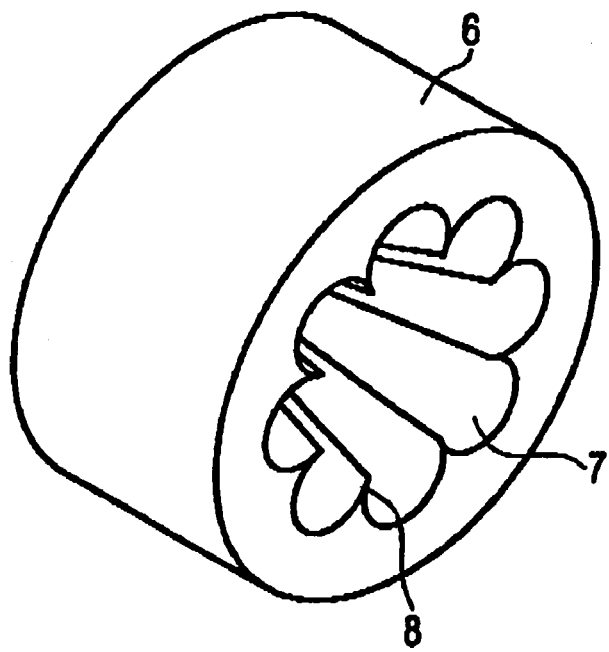
FIG. 2D is a perspective illustration of the bush illustrated in FIGS. 2A to 2C.

FIG. 2A shows a section through the bush 6 which exhibits a conical inner contour 7. This means that the opening 10 of the bush 6, which faces the filling tube 1, exhibits a smaller diameter than the opening 11 of the bush which faces away from the filling tube.

The opening angle α of the conical inner contour 7 lies in a range from 40 to 60°, preferably at about 50°. The height of the bush h is limited by the free space to the displacement elements. The diameter d of the bush is at least the caliber of the sausage. The diameter of the opening 10 is selected somewhat larger than the outer diameter of the filling tube 1, so that the sausage sleeve can pass under a region where the bush 6 and the filling tube 1 overlap. The diameter of the opening 11 corresponds essentially to the diameter of the filled sausage skein 13. The material of the bush 6 is preferably plastic, in particular POM (polyoxymethylene). The bush 6 is arranged such that its central axis M coincides with the central axis A of the device.

Figure 4:
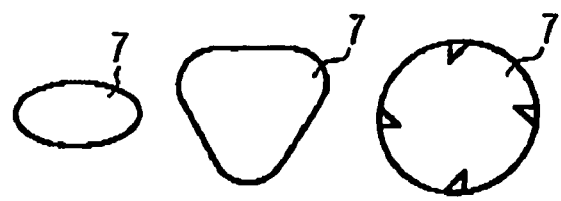
FIG. 4 shows possible arrangements of the conical inner contour.

According to a preferred embodiment, the bush 6 exhibits engaging ribs 8 on its conical inner contour 7. These engaging ribs 8 facilitate a form fit with the filled sausage sleeve 13. In this embodiment the surfaces between the ribs 8 are formed rounded to an arc shape. A form fit and thus an improvement in the engagement can, for example, be achieved by oval shaping of the cone, a rounded triangle or single-sided diagonal teeth, as shown for example in FIG. 4.

Since according to the disclosure the bush 6 with the conical inner contour 7 is arranged on the shoulder 9 of the skin brake 2, a sideward deflection and thus imbalance of the emitted filling flow is prevented and the forming sausage can be held in the center, i.e. the central axis of the filled sausage skein 13 extends essentially along the central axis A of the device. Due to this special process, the turbulence of the filling flow is reduced on exiting the filling tube.

It is possible that on the inner wall of the filling tube 1 a film of animal protein forms which flows under the sausage sleeve 14 when the filling material is ejected. The protein film is produced on the inner wall of the filling tube by friction and flows to the sausage sleeve. Because the turbulence of the filling flow can be minimised on exiting the filling tube 1 due to the bush 6, the protein film can be specifically passed to the outside and is then retained on the outer side of the sausage. The protein film is produced as follows: The animal protein present in the meat is separated out by friction and it collects on the inner wall of the filling tube 1. This protein film later hardens when the sausage is cooked, forming a "grid", so that the finished sausage has a solid outer envelope.

The method according to the disclosure functions as follows: The sausage sleeve 14, which is passed through the skin brake 2 under the brake ring 3, is gathered up in a known manner on the filling tube 1. Paste filling material, such as for example, sausage meat is ejected into the sausage sleeve 14 by a pump which is not illustrated. At the ejection end of the filling tube 1 the filled sausage sleeve then passes through the opening 10 of the bush 6 and slides along the conical inner contour 7 of the bush 6. In doing this, the filled sausage sleeve 13 is held in the center by the bush 6 and furthermore a sideward deflection and thus an imbalance of the emitted filling flow is prevented. The bush 6 furthermore also prevents the turbulences of the filling flow on emission from the filling tube 1, because in this regard the filling material cannot move uncontrollably radially outwards.

According to a preferred embodiment, as previously explained in more detail, a protein film can be formed on the inner wall of the filling tube 1 by friction and it can flow to the outer side of the sausage. Due to the special guidance through the bush 6, the turbulence of the filling flow on exiting the filling tube is reduced and the protein film can be specifically passed outwards and is thus retained in the outer region of the sausage.

The filled sausage sleeve 13 is passed through the longitudinal unit 4 and the ejected filling material in the transport direction T. The filled sausage sleeve 13 then passes to the pair of displacement elements 5*a*, 5*b*, whereby the displacement wings move towards one another in a rotational movement and displace the paste filling material in the filled sausage skein 13 to produce individual sausages. To twist off the sausages divided up by the displacement elements 5*a*, 5*b*, the filling tube 1 is rotated together with the skin brake 2 and the bush 6 about the axis A. The twist-off point 12 can form, because after the displacement elements 5*a, b* the filled sausage sleeve 13 is held, for example, between the two belts of the longitudinal unit 4 against rotation while before it the filled sausage sleeve is rotated with the filling tube 1 and skin brake 2 and twists with respect to the held sausage. The conical bush rotates at the same speed as the skin brake 2 and supports the rotation of the forming sausage. To support reliable twisting off, as previously described, the conical bush can be provided on the inner side with engaging ribs 8 to produce a form fit with the sausage.

The invention claimed is:

1. Device for the filling of sausage sleeves (14) with paste filling material, comprising:
    a filling tube (1) having an ejection end;
    a skin brake (2); and
    a bush (6) with a conical inner contour (7), the bush protruding over and fitted around the ejection end, and wherein the bush (6) rotates together with the skin brake (2).

2. Device according to claim 1, wherein the bush (6) is attached to the skin brake (2).

3. Device according to claim 2, wherein the bush (6) is attached to one of a housing (9) or to a support of the skin brake (2).

4. Device according to claim 1, wherein the conical inner contour (7) exhibits an opening angle (α) in a range from 40 to 60°.

5. Device according to claim 4, wherein the opening angle (α) approximately 50°.

6. Device according to claim 1, wherein the bush (6) is made of plastic.

7. Device for the filling of sausage sleeves (14) with paste filling material, comprising:

a filling tube (1) having an ejection end;
a skin brake (2); and
a bush (6) with a conical inner contour (7), the bush protruding over and fitted around the ejection end, and wherein the conical inner contour (7) exhibits longitudinal engaging ribs (8).

8. Device according to claim 6, wherein the plastic is POM.

9. Device according to claim 7 wherein the bush (6) is attached to the skin brake (2).

10. Device according to claim 9 wherein the bush (6) is attached to one of a housing (9) or to a support of the skin brake (2).

11. Device according to claim 7, wherein the conical inner contour (7) exhibits an opening angle (α) in a range from 40 to 60°.

12. Device according to claim 11, wherein the opening angle (α) is approximately 50°.

13. Device for the filling of sausage sleeves (14) with paste filling material, comprising:
    a filling tube (1) having an ejection end;
    a skin brake (2); and
    a bush (6) with a conical inner contour (7), the bush protruding over and fitted around the ejection end, and wherein the skin brake (2) is arranged on the filling tube (1) such that the ejection end of the filling tube (1) protrudes approximately 0 mm to approximately 2 mm over the skin brake (2).

14. Device according to claim 13, wherein the bush (6) is attached to the skin brake (2).

15. Device according to claim 14, wherein the bush (6) is attached to one of a housing (9) or to a support of the skin brake (2).

16. Device according to claim 13, wherein the conical inner contour (7) exhibits an opening angle (α) in a range from 40 to 60°.

17. Method of filling a sausage sleeve with paste material, comprising:
    gathering up a sausage sleeve (14) adjacent an ejection end of a filling tube (1);
    filling the sleeve (14) with paste material through the filling tube (1),
    passing a portion of the sleeve (14) disposed adjacent the ejection end of the filling tube (1) through a bush (6) with a conical inner contour (7);
    centering the sleeve; and
    rotating the bush (6) together with a skin brake (2) to twist off the filled sausage sleeve (14).

18. Device according to claim 16, wherein the opening angle (α) is approximately 50°.

* * * * *

UNITED STATES PATENT AND TRADEMARK OFFICE
CERTIFICATE OF CORRECTION

| | | |
|---|---|---|
| PATENT NO. | : 7,204,747 B2 | Page 1 of 1 |
| APPLICATION NO. | : 11/359177 | |
| DATED | : April 17, 2007 | |
| INVENTOR(S) | : Wolfgang Braig et al. | |

It is certified that error appears in the above-identified patent and that said Letters Patent is hereby corrected as shown below:

On the Title Page:

Item (30), "05004120" should be -- 05004120.1 --.

In the Claims:

At Column 5, line 49, "(α) approximately" should be -- (α) is approximately --.

At Column 6, line 9, "claim 7 wherein" should be -- claim 7, wherein --.

At Column 6, line 11, "claim 9 wherein" should be -- claim 9, wherein --.

Signed and Sealed this

Twentieth Day of May, 2008

JON W. DUDAS
*Director of the United States Patent and Trademark Office*